Oct. 26, 1965
E. H. COOKE-YARBOROUGH
3,214,588
ION CHAMBER DOSIMETER FOR NUCLEAR RADIATIONS
Filed May 21, 1963
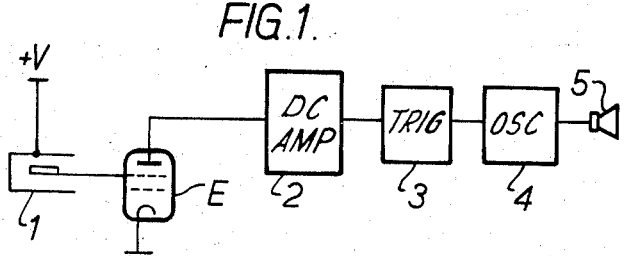
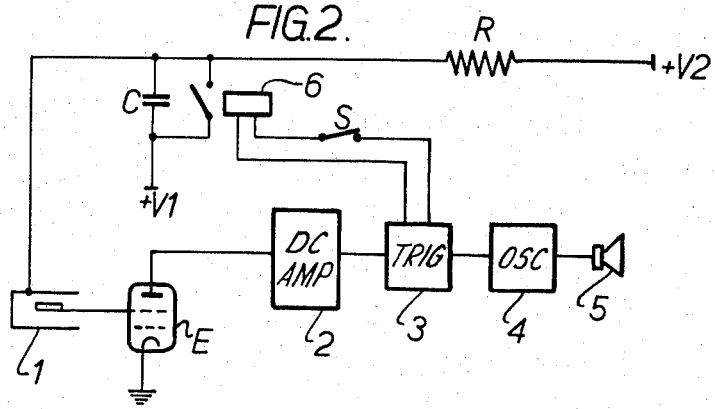
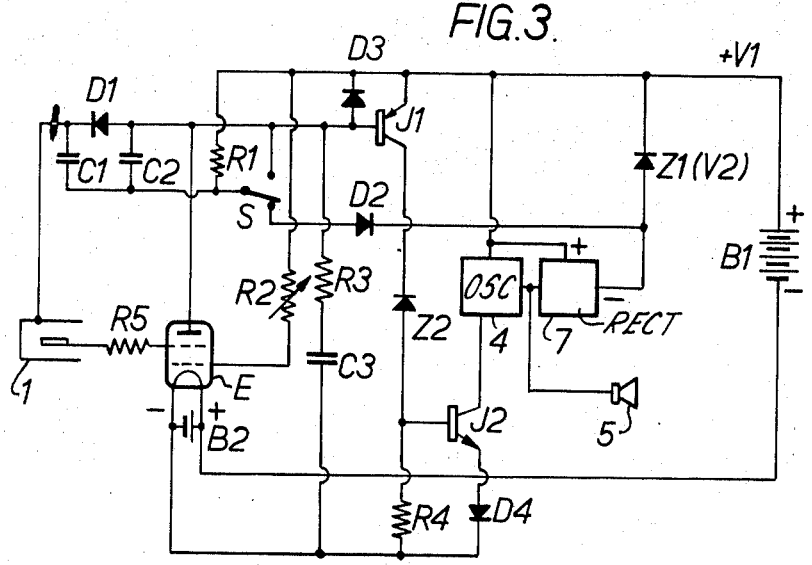

United States Patent Office 3,214,588
Patented Oct. 26, 1965

3,214,588
ION CHAMBER DOSIMETER FOR NUCLEAR RADIATIONS
Edmund Harry Cooke-Yarborough, Longworth, Abingdon, England, assignor to U.K. Atomic Energy Authority, London, England
Filed May 21, 1963, Ser. No. 282,063
Claims priority, application Great Britain, May 21, 1962, 19,448/62
3 Claims. (Cl. 250—83.6)

This invention relates to dosimeters for nuclear radiations.

In work which involves exposure to nuclear radiations, especially X and gamma radiations, e.g. handling radioactive substances, it is desirable that the worker should be warned if the total radiation dose he has receive exceeds some predetermined value. Dosimeters exist which give a visual indication of the total dose received, for example quartz-fibre pocket dosimeters and other forms of personal indicating dosimeters, but certain kinds of work preclude repeatedly viewing a visual indicator. In such cases an indication which can be perceived without actually inspecting a visual indicator is desirable.

It is also desirable that a fault in the dosimeter should not occur without the worker being aware of it, and that the dosimeter should indicate to the worker when the predetermined value of dose is being approached, so that he can organise his work to enable him to leave the area promptly when the full dose is reached.

Accordingly the present invention provides a dosimeter wherein, the ion chamber being initially charged, the polarising electrode is caused to rise progressively in potential until the collector electrode reaches a threshold level whereupon the polarising potential is caused to return rapidly to its initial level and to recommence its rise, a momentary warning being given each time the threshold level is reached, the time interval between successive warnings thus decreasing progressively as the potential difference between the electrodes slowly falls owing to ionisation current flowing in the chamber.

Also according to the present invention, a dosimeter comprises an ionisation chamber having its collector electrode connected to a voltage-sensitive trigger circuit and its polarising electrode connected to a circuit adapted to apply thereto a sawtooth voltage rising from a given level, the end of each sawtooth and the beginning of the next being initiated when the trigger circuit triggers, whereby, said chamber being initially charged with its polarising electrode at said given level and its collector electrode at a level below the threshold of the trigger circuit, the trigger circuit triggers each time the collector electrode is raised to the threshold voltage, the duration of successive sawteeth thus diminishing progressively as the voltage across the chamber falls owing to the presence of ionising radiation, and warning means operated momentarily each time the trigger circuit triggers.

The warning means may be aural.

To enable the present invention to be more readily understood, attention is directed, by way of example, to the accompanying drawings wherein:

FIG. 1 is a schematic circuit diagram of one form of dosimeter,

FIG. 2 is a partially schematic circuit diagram of one form of dosimeter embodying the present invention, and FIG. 3 is a circuit diagram of another form of dosimeter embodying the present invention.

FIG. 1 shows a simple dosimeter which produces an aural signal as soon as a predetermined dose is reached. Initially the control grid of the electrometer valve E is biased negatively so that the valve does not conduct. When the ion chamber 1, initially charged to above saturation voltage, is exposed to radiation, the resultant ionisation current causes the potential of the collecting (inner) electrode of the ion chamber to rise towards the potential V of the polarising (outer) electrode. The volume of the ionisation chamber, its capacitance and the initial voltage to which it is charged are so chosen that the electrometer valve comes into conduction when the predetermined dose has been reached. The electrometer valve anode current is amplified in the D.C. amplifier 2 and applied to a trigger circuit 3 which turns on an oscillator 4, causing an aural alarm from a loud-speaker 5. It will be seen that valve E, amplifier 2, and circuit 3 together form a voltage-sensitive trigger circuit connected to the collector electrode of the ion chamber.

This arrangement has two disadvantages. Firstly, a failure of certain circuit elements could prevent a warning from being given, without the worker wearing the dosimeter knowing that failure has occurred; secondly, because the warning is sudden the wearer has no information about the progress of his dose and so cannot organise his work to leave the working area promptly when the full dose has been reached.

It is desirable that the wearer should receive frequent audible indications of the amount of dose he has received, which at the same time would tell him that the instrument was operating correctly. When the dose is well below the maximum permitted level the audible indication should be clear but not irritating, and when the maximum dose has been reached the indication must be unmistakable.

In a dosimeter according to the present invention this result is achieved by causing the potential of the polarising electrode of the ion chamber to rise progressively, starting from a positive voltage sufficient to saturate the ion chamber if the collector electrode is near to, or negative with respect to, filament potential, and rising towards a much higher voltage. As the polarising electrode potential rises, the electrometer value will at some point come into conduction, and the time interval before this occurs is a measure of the charge remaining on the ion chamber. As soon as the electrometer valve begins to conduct, an audible note or "pip" is produced, the potential of the polarising electrode of the ion chamber is restored rapidly to its starting potential, thus cutting off the electrometer valve, and the cycle is repeated. As the dose increases (i.e. as the potential difference across the ion chamber falls owing to the reduced charge), the interval between "pips" become less, i.e. the voltage applied to the polarising electrode becomes a sawtooth of diminishing amplitude and duration. Eventually the electrometer valve remains in conduction even when the polarising electrode of the ion chamber is at its lowest potential, and a continuous note is then produced. The slope of each sawtooth need not be linear; in fact using a portion of the exponential change of voltage across a charging or discharging capacitor may give a more desirable law relating "pip" frequency to dose.

One circuit of this kind is shown in FIG. 2. The polarising electrode of the ion chamber 1 is connected to a capacitor C so that its potential rises progressively as C is charged through a resistor R connected to a source of relatively high potential +V2. When the current in the electrometer valve E becomes large enough to operate the trigger circuit 3 the latter not only starts the oscillator 4 but also operates a relay 6 which short-circuits capacitor C and returns the polarising electrode of the ion chamber to its original potential +V1. The ion chamber can be initially charged, and the bias conditions set, by momentarily disconnecting the relay 6, e.g. by switch S, so that C continues to charge through R until it reaches the potential V2. The ion chamber 1 will charge to a similar voltage owing to the flow of grid current in valve E. On reconnecting switch S, the polarising potential falls to +V1 and the collector potential to −(V2−V1).

This arrangement has the disadvantage of requiring a source of positive potential V2 which should preferably be large compared with the length of the electrometer valve grid base, so that variations of the latter will have little effect. It also requires a relay, which tends to be a disadvantage in an instrument which should be small, robust and economical of current. In principle, the relay could be replaced by a transistor, but the leakage current would have to be very low even at a potential of several tens of volts, otherwise it would develop a significant voltage across R, which might have a value of at least some tens of megohms in order that the value of C should be kept within practical limits.

An improved circuit is shown in FIG. 3. This avoids the need for a switching transistor operating at the polarising electrode of the ion chamber, semiconductor diodes being used instead, since the requirements of low leakage and the ability to withstand several tens of volts are at present better met with a diode than with a transistor. Other features of the circuit are that the polarising electrode potential of the ion chamber is obtained by transforming and rectifying the output of the audio oscillator, and that the current required to lower the polarising electrode potential of the ion chamber when the electrometer valve starts conducting is fed into the base of the first D.C. amplifier transistor. This provides the current feedback necessary for trigger action and avoids the need for the separate trigger circuit 3.

The circuit operates as follows. The output of the oscillator 4 is rectified by rectifier 7 and fed via diode D2 to charge capacitors C1 and C2 negatively. The positive sides of C1 and C2 are at the base potential of the p-n-p transistor J1 which is approximately +V1. Since the charging current of these capacitors flows through J1 base, J1 and the n-p-n transistor J2 are kept conducting, and the oscillator is kept oscillating, until C1 and C2 are charged to a voltage V2 equal to the voltage of the Zener diode Z1. The current from the oscillator is then diverted to Z1, and the flow of current through C1, C2 and J1 base ceases. This cuts off J2 which stops the oscillator, and C2 slowly discharges through R1 and diode D3. C1 does not discharge appreciably, because of diode D1, so the positive side of C1 becomes correspondingly more positive with respect to +V1. This process continues until E begins to conduct (after a time interval dependent upon the potential difference across the ion chamber 1, and hence on the charge thereon) and turns on J1 and J2. The oscillator 4 then starts and the negative sides of C1 and C2 are returned to −V2 relative to +V1. In principle the voltage across C1 does not change appreciably during the process, so C1 can be regarded as a source of constant potential. A small amount of charge may be lost by C1 in the period between "pips," but this is replenished by conduction through D1 when the oscillator turns on.

Of the remaining components in FIG. 3, the Zener diode Z2 provides D.C. coupling between J1 collector and J2 base and gives warning if the battery voltage falls too low, in which case Z2 will not conduct and J1 cannot turn on J2. D4 ensures that J2 is non-conducting until its emitter is pulled above the forward conduction voltage of D4 by J1 collector; thereafter D4 presents a low impedance to the supply of oscillator current via J2. It will be noted that the negative rail is the negative side of battery B2, so that +V1 is equal to the sum of the voltages of B1 and B2.

When the circuit is first switched on, the charging current of C3 via R3 momentarily turns J1 on, the oscillator starts and charges C1 and C2 which permits charging of the ion chamber. This is achieved by momentarily using switch S to disconnect D2 and short-circuit C2, when the positive side of C1 and the polarising electrode are both drawn to a potential +(V1+V2) relative to the filament of valve E. The flow of grid current, limited to a safe value by R5, then charges the chamber to this potential. When S is returned to its normal position, the oscillator again drives the negative sides of C1 and C2 negative by −V2 and then cuts off. Provided the ion chamber retains its original charge, E will come into conduction when C2 has discharged to a point where the voltage across it is equal to the grid-base of E. Since the latter is much smaller than V2, the time taken is greater than the time-constant C2.R, and this time is sensitive to variations in the length of the grid-base; however it is possible to control the length of the grid-base to a limited extent by using R2 to adjust $V_{g1}$. When the valve E is first fitted in the dosimeter, R2 is adjusted to give the correct interval between "pips" (sawtooth duration) with a fully charged ion chamber. During subsequent use, the existence of approximately the correct interval between "pips" immediately after recharging the chamber is a reliable indication that the valve is operating normally. Most circuit failures would cause the interval between "pips" immediately after recharging to be far from correct, or failure of the "pips," or a high-dose indication, so the probability of the dosimeter "failing to danger" is remote.

In some applications of the invention the warning indication may be other than aural. For example, in a dosimeter designed for bench use, rather than one worn by the worker, the indication might be a flashing light.

I claim:

1. A dosimeter comprising an ion chamber having a polarising electrode and a collector electrode, means for charging the ion chamber initially so that a potential difference is set up between said polarising electrode and said collector electrode, said potential difference decreasing slowly when the ion chamber is subjected to radiation which causes an ionisation current to flow between said polarising electrode and said collector electrode, means for causing the potential of said polarising electrode to rise progressively until the potential of said collector electrode reaches a threshold value, means for giving a momentary warning each time the potential of said collector electrode reaches said threshold value, and means for returning the potential of said polarising electrode to its initial value to recommence its rise each time the potential of said collector electrode reaches said threshold value.

2. A dosimeter as claimed in claim 1 wherein said momentary warning is aural.

3. A dosimeter comprising an ion chamber having a polarising electrode and a collector electrode, a voltage sensitive trigger circuit to which said collector electrode is connected, means for charging the ion chamber initially so that a potential difference is set up between said polarising electrode and said collector electrode, said potential difference decreasing slowly when the ion chamber is subjected to radiation which causes an ionisation current to flow between said polarising electrode and said collector electrode, means for applying a sawtooth waveform to said polarising electrode so that the potential of said polarising electrode rises progressively until the potential of said collector electrode reaches a threshold value at which said trigger circuit triggers, means for giving a momentary aural warning each time said trigger circuit triggers, and means for ending one sawtooth and beginning the next sawtooth of said waveform each time said trigger circuit triggers so that the duration of each successive sawtooth diminishes progressively as the potential difference between said polarising electrode and said collector electrode decreases.

References Cited by the Examiner
UNITED STATES PATENTS

| | | | |
|---|---|---|---|
| 2,506,435 | 5/50 | Rossi | 250—83.6 |
| 2,646,556 | 7/53 | Allen | 250—83.6 |
| 2,938,123 | 5/60 | Constable | 250—83.6 |
| 2,955,207 | 10/60 | Pearson | 250—83.6 |
| 2,963,588 | 12/60 | Wilson | 250—83.6 |
| 3,015,031 | 12/61 | Dilworth | 250—83.6 |
| 3,019,339 | 1/62 | Wesley | 250—83.6 |
| 3,065,348 | 11/62 | Cockbaine | 250—83.6 |

RALPH G. NILSON, *Primary Examiner*.

JAMES W. LAWRENCE, *Examiner*.